Patented Oct. 22, 1940

2,219,095

UNITED STATES PATENT OFFICE 2,219,095

METHOD FOR THE PRODUCTION OF PISTON RINGS, ESPECIALLY OF LIGHT METAL PISTONS FOR INTERNAL COMBUSTION ENGINES

Paul Schüttler, Berlin-Charlottenburg, Germany

No Drawing. Application April 14, 1938, Serial No. 202,134. In Germany May 12, 1936

2 Claims. (Cl. 75—22)

This invention relates to a method for producing packing rings for the pistons of internal combustion engines, especially for those made of light metal. It is known that the packing rings usually employed for such pistons are made of cast iron, so-called grey cast iron, because this material has hitherto given the best results with all kinds of piston engines. However, when employing cast-iron rings for pistons cast in light metal, the objection arises that the grooves in the pistons serving for the accommodation of the rings, knock out, that is widen after having been in use for a relatively short time, so that the rings lose their good fit. Every stroke of the piston results in blow-like pressure forces acting on the lateral bearing surfaces of the grooves, these forces being the greater the greater the specific gravity of the rings is; they result in rapid wear on the piston body because its material is not as hard as cast iron, especially at high temperatures. This objection has been known for a long while, and it has been proposed, for example, to line the piston grooves with cast-in hard rings of steel or cast iron, in order to protect them against too rapid wear. Such expedients, however, are unsatisfactory. They make the piston heavier and more complicated; the different expansion coefficients of the light metal and the iron or steel under heat leads to difficulties in practice and thermal disadvantages arise which will be referred to hereinafter. In exceptional instances it has been proposed in literature to also make the piston rings of light metal in order to transfer the resultant wear to the cheap piston rings. but these propositions have not been followed in practice. The reasons are obvious. Cast light metal rings are not very suitable for packing against the high pressures which occur in the combustion chamber of the engine, because cast light metal is far more liable to leakages and flaws than ordinary grey cast iron. Furthermore, light metal rings, owing to their slight hardness in hot state and particular surface hardness, wear much too quickly at the outer packing surfaces which continually slide along the cylinder wall. However, it is above all also difficult to make such rings with a degree of elasticity which is maintained at high working temperatures and is necessary for a tight bearing contact. These objections to the light metal rings are justly regarded as so serious that the advantage of reduction in weight becomes an insignificant factor.

The invention is based, on the one hand, on the consideration that the piston ring made of light metal would offer, apart from the advantage of reduction in weight or of protection of the piston ring-grooves, other advantages of much greater importance, namely advantages which are capable of favourably influencing the construction and the working capacity of the piston itself, even the degree of mechanical and thermic efficiency of the whole internal combustion engine; the invention is based on the other hand on the recognition of the fact that the objections to light metal rings, which have hitherto prevented their introduction in practice, can be overcome if the rings are produced not by casting but according to a special method of production.

The piston ring according to the invention differs from the known light metal rings in that it is formed in a sintering process from pulverous metal, that is of metal powder which is caused to fuse and intimately unite in known manner by heavy pressure, if necessary under a more or less increased temperature. As is known, the sintering process enables the production of solid bodies with exceptionally dense structure, when fine grained metal powder is used as initial material. A packing ring made in this manner is absolutely homogenous and has no blow holes or flaws which might lead to leakages in service. Furthermore, the sintering process enables the production of alloys which cannot be produced at all by casting, or in any case not in a satisfactory manner. This is important because it is possible, by additions of heavy metals, to impart to the piston ring made of light metal all the properties which are lacking in light metal, namely ample strength, sufficient hardness on the outer sliding surface—especially at high temperatures—also increased elasticity and improved sliding capacity and high wear resistance. These properties can be attained, without considerably reducing the heat conductivity, by adding to the light metal certain admixtures of heavy metals which will be referred to in greater detail hereinafter. These heavy metals are also prepared in pulverous state with fine grain and intimately mixed with the aluminium powder which may also contain admixtures up to 1% of magnesium, beryllium or lithium for increasing the hot strength, and caused to sinter and fuse under high pressure at a suitably high temperature. If heavy metals having a high melting point are liquified and alloyed with aluminium, whose melting point lies at about 700° C., by heating in the usual way, considerable difficulties arise owing to the different fusibilities. Certain metals, such as chromium, cobalt, molybdenum and the like, which are very difficult to melt, can only be alloyed with aluminium by a very expensive and time wasting process. However, it is not possible to obtain such alloys in homogenous form by casting, as the restricted solubility and the eutectic limits narrow the possibilities of the composition of the alloy and even within these limits separations occur during the combined casting, owing partly to the impossibility of maintaining the casting temperature sufficiently high and uniform everywhere in view of the moulds. By the ordinary method of alloying metals it is impossible to prevent metals, which are not easily fusible, to form on cooling larger crystals unequally distributed in the mass, with the result that the properties of the casting are not improved but may even be impaired. The desired strength, hardness, elasticity and so forth can only be attained if the mixing of the different metals is intimate, homogenous and thorough; otherwise, for example very hard portions are formed which make machining difficult, besides other soft portions which possess a low resistibility and so forth. The sintering process, on the other hand, overcomes the objections inherent in melting and casting processes. It makes it possible to exceed as desired the eutectic or solubility limits. Separations can no longer occur, as the metals have already received in powdered state the size of grain and mixing necessary for alloying and are juxtaposed in the desired manner in the sintering process. The occurrence of unequally distributed crystallization products with excessively large grains is reliably avoided. Consequently, it is possible in the manner described to produce piston rings from light metal with a material composition which substantially conforms to the practical requirements as regards hot hardness, sliding capacity, resistance against wear, heat conductivity and permanent elasticity. The material of the piston ring has a uniform lattice-like structure, which, owing to the lack of large crystals, presents no difficulties to machining.

Cobalt may be mentioned as a particularly suitable heavy metal which considerably increases the hot hardness, resistance against wear and elasticity without excessively reducing the heat conductivity. On account of its high melting point it can only with difficulty be alloyed with aluminium. Endeavours to intermix by smelting preliminary alloys failed on account of the excessive stressing of the crucible, with the result that the process became uneconomical.

However, for the production of light metal piston rings the use of cobalt admixtures is of particular interest as cobalt, contrary to other metals, does not form with aluminium mixed crystals but forms therewith a compound of the formula $Co_3Al_{13}$ which shows exceptionally favourable properties for the above mentioned purpose of use and imparts to the piston ring the properties, which it requires for fulfilling its duty.

As the sintering process also enables the admixture of other heavy metals which do not enter into combination with aluminium, without being restricted, like the smelting process, to eutectic limits, additions of nickel, copper, manganese and chromium can be employed besides cobalt, nickel and copper being used for improving the heat conductivity and sliding capacity, and manganese and chromium for increasing the elasticity. For example a sintered alloy within the limits of 10 to 30% cobalt, 2 to 5% nickel, 1 to 4% manganese, 2 to 5% chromium, remainder aluminium, to which additions of lithium, beryllium and magnesium can be added in a percentage of 1%, shows a hot hardness up to 80 Brinell at 300° C., a heat conductivity of 0.3 and sufficiently great wear resistibility. By way of comparison the values are cited for grey cast iron as hot hardness 150 Brinell at 300 C. and heat conductivity 0.1, and of the best light metal piston alloys as hot hardness 45 Brinell at 300° C. and heat conductivity 0.4. The additions of chromium, manganese and nickel, indicated in the proposed sintered alloy, may be entirely or partly replaced by metallurgically approximately equivalent heavy metals such as tungsten, molybdenum, titanium and others, values being also obtainable therewith which ensure a practical utilization of the sintered light metal piston ring.

In piston rings produced by casting, it is customary to produce the necessary resilient tension by hammering. It is not advisable to employ this method for sintered rings owing to their lattice-like structure. In the present instance it is advisable to subject the finished rings to a subsequent heat treatment to give them the tension which is necessary for bearing against the cylinder wall. This may be effected, for example, by stretching the split ring in rough or finished machined state on a stretching mandrel, subjecting it for a relatively long time to a suitably high temperature and, if necessary, quenching it. The ring thus receives its final shape which enables it, when fitted, to exert a sufficiently strong pressure against the cylinder wall.

The properties of the piston ring produced from light metal by the sintering process may be still further improved by providing the sliding surface of the ring with an eloxal coating—that is with a known oxidation of the aluminium on its surface produced by electric means. By the eloxidation not only the hardness on the surface is increased and consequently the liability to wear reduced, but chiefly the heat conductivity of the ring is improved to an exceptional extent. Experiments have shown, that the capacity to absorb and radiate heat is increased many times, this being of special importance in the present instance, as will be hereinafter explained.

In this manner packing rings can be produced from light metal, which are in no way inferior to the ordinary grey cast iron rings as regards the above mentioned properties. On the other hand, however, they are in many important respects superior to the ordinary piston rings. In spite of the admixtures of heavy metals which only constitute a fractional part of the whole mass, the specific gravity is low and does not greatly exceed that of the alloy from which the piston is made. Consequently, the wear in the piston ring grooves is correspondingly less. Far more important are the advantages which have hitherto obviously not been recognized and which consist in that the piston ring made of light metal has an extremely good heat conductivity, which is is about three times as great as that of cast iron and which is even further improved by the additions of heavy metals. It is known that, when the engine is running, the highest temperature prevails at the piston head, that is at the end face of the piston, which is constantly in contact with the gases in state of combustion. At this point the piston continually absorbs heat which is conducted off on the cooled cylinder wall. It has been found by measurements that the working temperature on the end face of the piston amounts to about 250° C. and in the head carrying the piston rings the heat is still approximately 200° C. whereas the piston skirt extending therefrom and which is usually separated from the piston head by a slot extending around its entire periphery or around the greater part thereof, has a temperature of 130°. As the cooled cylinder wall has a temperature of, for example, 80° C., the temperature drop on the piston head is 120° as against a drop of only 50° C. between the piston skirt and the cylinder wall. It would be advantageous for the cooling of the piston if the heat were to be conducted off to the cooled cylinder wall at the place where the heat is greatest, that is at the piston head. However, the external diameter of the piston head is usually smaller than that of the skirt so that a gap filled with oil remains between the head and the cylinder wall and is a bad conductor of heat. The heat exchange between the head and the cylinder can only be effected by means of the piston rings which bear tightly against the cylinder wall. If now these rings are of cast iron, whose heat conductivity is only one third as great as that of light metal, then an accumulation of heat occurs, which causes this portion to assume a very high working temperature. This accumulation of heat is increased still further when the piston ring grooves are provided with a worse heat conducting lining of cast iron, as mentioned above. The portion of the piston head, in which the ring grooves are, remains at a temperature which very nearly approaches that of the end face of the piston.

Now it is known that the hardness of the light metal reduces very quickly under increasing temperature. Whereas in cold state it amounts to about 120 Brinell, it drops to 60 Brinell already at 250° C. This considerable reduction in hardness is mainly the reason why the piston ring grooves wear relatively rapidly in service. This objection can best be overcome if provision is made for leading off the heat from the piston head to the cylinder in a more effective manner than is the case in the known piston constructions. This greatly improved cooling takes place when the heat radiation to the cylinder wall is effected by means of the body of light metal with which special good conducting additions of heavy metals are mixed. Even if the specific gravity and hardness of the piston ring are slightly increased by these additions, this is immaterial provided the material of the piston head is not rendered too soft in service by this improved heat discharge.

The reduction of the working temperature of the piston head is however accompanied by other practical advantages. As already mentioned, the piston head in the known pistons must be of appreciably smaller diameter than the piston skirt on account of the greater expansion. Whereas, for example, the ordinary light metal pistons of internal combustion engines can run with a clearance of five hundredths of a millimeter at the piston skirt, this, for example in a piston of about 80 millimeters in diameter, must be about two to three tenths of a millimeter between the piston wall and the piston head in order to prevent the piston from seizing. The disadvantage resulting herefrom is, that in practical service the oil film is always considerably thicker, and consequently a worse heat conductor, between the piston head and the cylinder wall than the relatively thin oil film between the piston skirt and the piston wall. The invention renders it possible, to make the clearance and consequently the thickness of the oil film less at the piston head because the expansion of the piston head is less. A much better heat exchange and consequently an involution of the cooling effect is obtained at these points. If the expansion of the piston head is less, it is also possible to reduce the clearance between the bottom of the piston ring grooves and the light metal rings. Consequently, the oil or air gap will likewise be narrower at this point and the heat exchange between the piston head and the piston ring greater.

If the working temperature at the piston head is considerably lower, the thickness of the piston body which is subjected to the heaviest stressing, may be made correspondingly less, so that the piston weight is reduced and an improvement in the degree of mechanical efficiency of the engine attained.

Furthermore, by retaining the same piston body head thickness, the ratio of compression of the engine can be increased on account of the reduced temperature of the piston head, with the result that the thermal efficiency of the engine and consequently its output are improved and the fuel consumption is reduced. Especially in the case of Diesel engines, in which the piston heads are made in compound casting from light metals of different heat conductivities on account of the high heat stressing, these heads can be made in a uniform material thereby facilitating and cheapening the production.

The possibility of reducing the clearance between the piston head and cylinder wall effects not only an improved heat discharge, but has also the advantageous result that the piston ring projects less from the piston ring groove; the part of the piston ring surface subjected to the explosion pressure therefore becomes smaller and consequently the pressure forces to be taken up by the bearing surface of the piston ring groove and which are the determining factor for the wear thereof also become less.

Another point worthy of attention is, that the danger of the piston rings seizing is less great, because the oil located between the piston rings and the piston ring grooves is exposed to a lower temperature. Particularly the accumulation of heat occurring in the known constructions contributes to a considerable extent in the cracking of the oil and the seizing of the rings.

Finally it is pointed out that, owing to less heat being radiated by the piston head, the working temperature of the piston skirt is reduced. The piston skirt with its bearings carrying the gudgeon pin possesses a greater hot hardness this being particularly important for the durability of the gudgeon pin bearings.

Consequently, all difficulties of thermal and mechanical nature, which are due to the piston head not being sufficiently freed from the accumulating heat, are reduced to such an extent that the employment of the light metal piston rings causes a favourable abduction from the piston head to the cooled cylinder walls.

I claim:

1. A method for the production of piston rings especially for light metal pistons of internal combustion engines, consisting of subjecting light metal composed of a mixture comprising 10% to 30% cobalt, 2 to 5% nickel, 1 to 4% manganese, 2 to 5% chromium and the remainder largely aluminium, all in fine powderous state to a sintering process by causing the powderous metal to intimately unite under high pressure and temperature in a press mold.

2. A method for the production of piston rings especially for light metal pistons of internal combustion engines, consisting of subjecting light metal composed of a mixture comprising 10% to 30% cobalt, 2% to 5% nickel, 1% to 4% manganese, 2% to 5% chromium and the remainder aluminium, with additions of about 1% of lithium, beryllium and magnesium, all in fine powderous state to a sintering process by causing the powderous metal to intimately unite under high pressure and temperature in a press mold.

PAUL SCHÜTTLER.